(12) United States Patent
Fujii

(10) Patent No.: US 8,990,222 B2
(45) Date of Patent: Mar. 24, 2015

(54) ADDRESS BOOK CENTRAL ADMINISTRATION APPARATUS, ADDRESS BOOK CREATION METHOD THEREOF AND RECORDING MEDIUM

(75) Inventor: Masato Fujii, Nagaokakyo (JP)

(73) Assignee: Konica Minolta, Inc., Tokyo (JP)

(*) Notice: Subject to any disclaimer, the term of this patent is extended or adjusted under 35 U.S.C. 154(b) by 419 days.

(21) Appl. No.: 12/552,683

(22) Filed: Sep. 2, 2009

(65) Prior Publication Data

US 2010/0063972 A1 Mar. 11, 2010

(30) Foreign Application Priority Data

Sep. 3, 2008 (JP) .................................. 2008-226533

(51) Int. Cl.
- *G06F 17/30* (2006.01)
- *G06Q 10/00* (2012.01)
- *G06Q 10/10* (2012.01)

(52) U.S. Cl.
CPC ............... *G06Q 10/00* (2013.01); *G06Q 10/10* (2013.01)
USPC .......................................... 707/748; 707/737

(58) Field of Classification Search
USPC ........................................ 707/748, 822, 737
See application file for complete search history.

(56) References Cited

U.S. PATENT DOCUMENTS

| | | | |
|---|---|---|---|
| 6,738,462 B1 * | 5/2004 | Brunson | ................ 379/142.06 |
| 7,493,643 B2 | 2/2009 | Ellis | |
| 7,603,684 B1 | 10/2009 | Ellis | |
| 7,827,582 B2 | 11/2010 | Ellis | |
| 2004/0186848 A1 * | 9/2004 | Kobashikawa et al. | ........ 707/102 |
| 2005/0004928 A1 * | 1/2005 | Hamer et al. | ................. 707/100 |
| 2006/0168344 A1 * | 7/2006 | Tsuchiya | ...................... 709/245 |
| 2007/0288704 A1 * | 12/2007 | Mizuno | ......................... 711/154 |
| 2008/0192911 A1 | 8/2008 | Seo | |

(Continued)

FOREIGN PATENT DOCUMENTS

| | | |
|---|---|---|
| JP | 6-237324 | 8/1994 |
| JP | 8-125823 | 5/1996 |

(Continued)

OTHER PUBLICATIONS

Japanese Notification of Reasons for Refusal mailed Sep. 7, 2010, directed to Japanese Patent Application No. 2008-226533: 10 pages.

(Continued)

*Primary Examiner* — Rehana Perveen
*Assistant Examiner* — Tiffany Thuy Bui
(74) *Attorney, Agent, or Firm* — Osha Liang LLP

(57) ABSTRACT

An address book central administration apparatus connected to a plurality of image processing apparatuses via a network includes: a data collector under control of a CPU of the address book central administration apparatus that collects, from the plurality of image processing apparatuses administered by the address book central administration apparatus, at least transmission histories of a plurality of transmission users including a particular user and other users, the transmission histories including records proving that the transmission users have conducted data transmission from the image processing apparatuses, a destination data extractor that extracts destination data from the transmission histories collected by the data collector, and an importance level calculator that performs a calculation to calculate levels of importance of the destination data extracted by the destination data extractor.

15 Claims, 8 Drawing Sheets

(56) References Cited

U.S. PATENT DOCUMENTS

| | | | |
|---|---|---|---|
| 2009/0240657 A1* | 9/2009 | Grigsby et al. | 707/3 |
| 2011/0004905 A1 | 1/2011 | Ellis | |

FOREIGN PATENT DOCUMENTS

| | | |
|---|---|---|
| JP | 8-130600 | 5/1996 |
| JP | 10-98604 | 4/1998 |
| JP | 2003-76628 | 3/2003 |
| JP | 2003-134217 | 5/2003 |
| JP | 2004-153420 | 5/2004 |
| JP | 2004-172756 | 6/2004 |
| JP | 2006-157922 | 6/2006 |
| JP | 2006-254171 | 9/2006 |
| JP | 3900043 | 1/2007 |
| JP | 2007-110263 | 4/2007 |
| JP | 2007-259072 | 10/2007 |
| JP | 2007-288574 | 11/2007 |
| JP | 2007-288806 | 11/2007 |
| JP | 2008-506277 | 2/2008 |
| JP | 2009-188825 * | 8/2009 |
| WO | WO-2005/107294 | 11/2005 |

OTHER PUBLICATIONS

Japanese Notification of Reasons for Refusal mailed Nov. 30, 2010, directed to Japanese Patent Application No. 2008-226533; 17 pages.

* cited by examiner

| Type of Transmission | Destination Name | Destination Detail |
|---|---|---|
| FTP | Group D | ftp://d-bu/in/ |
| E-mail | Company A | abc@def.co.jp |
| Fax | Account Manager, Company B | 012-345-6789 |
| E-mail | Company B | xyz@def.co.jp |
| ⋮ | ⋮ | ⋮ |

FIG.4

| Transmission Date and Time | User Name | Type of Transmission | Destination | Result |
|---|---|---|---|---|
| June 10, 19:40 | a | E-mail | Company A | OK |
| June 11, 8:32 | b | FAX | Company C | OK |
| June 11, 8:55 | c | I-FAX | Company D | OK |
| ⋮ | ⋮ | ⋮ | ⋮ | ⋮ |

FIG.5

| No | Type of Transmission | Destination Name | Destination Detail | Number of Transmission Times |
|---|---|---|---|---|
| 1 | E-mail | Company A | abc@def.co.jp | 26 |
| 2 | Fax | Account Manager, Company B | 012-345-6789 | 18 |
| 3 | I-Fax | Company C | ghi@jkl.com | 15 |
| ⋮ | ⋮ | ⋮ | ⋮ | ⋮ |
| 16 | FTP | Group D | ftp://d-bu/in/ | 1 |

FIG.6

| Type of Transmission | Destination Name | Destination Detail |
|---|---|---|
| E-mail | Company A | abc@def.co.jp |
| Fax | Account Manager, Company B | 012-345-6789 |
| I-Fax | Company C | ghi@jkl.com |
| ⋮ | ⋮ | ⋮ |

FIG.7

Coefficient Value to Apply

| Transmission Time | Most Recent Month | 2nd Most Recent Month | 3rd Most Recent Month | ... | Earlier Than Most Recent p Months |
|---|---|---|---|---|---|
| Coefficient Value | p | p-1 | p-1 | ... | 1 |

FIG.11

ADDRESS BOOK CENTRAL ADMINISTRATION APPARATUS, ADDRESS BOOK CREATION METHOD THEREOF AND RECORDING MEDIUM

This application claims priority under 35 U.S.C. §119 to Japanese Patent Application No. 2008-226533 filed on Sep. 3, 2008, the entire disclosure of which is incorporated herein by reference in its entirety.

BACKGROUND OF THE INVENTION

1. Field of the Invention

The present invention relates to an address book central administration apparatus that centrally administers address books stored in a plurality of image processing apparatuses connected to the address book central administration apparatus via a network, an address book creation method of the address book central administration apparatus, and a computer readable recording medium having a program recorded therein to make a computer execute processing.

2. Description of the Related Art

The following description sets forth the inventor's knowledge of related art and problems therein and should not be construed as an admission of knowledge in the prior art.

For recent years, the spread of networks has brought MFPs (Multi Function Peripherals) such as multifunctional digital image forming apparatuses, to each area in companies, offices and other places. And now, people more often interconnect the plurality of MFPs via a network such as LAN, in order to transmit image data read out by one of the MFPs via the network, to another one of the MFPs or a predetermined destination.

To facilitate use of the MFPs employed in such an environment, each of the MFPs stores in itself address books including destination data pieces. And when a user intends to transmit image data or other data to another user by operating a MFP, he/she selects a destination data piece from his/her own address book stored in the MFP.

However, it is not useful in the conventional practice, that a user owns address books only in MFPs in which he/she is registered as a user in advance, and cannot use his/her own address books by operating a MFP other than those.

To take a measure to resolve this, there is a suggested technology to make a server centrally administer respective users' address books and allow the users to use their own address books by operating any of the MFPs, and introduction of this technology is now being considered.

However, in this case, it takes a lot of work to manually migrate the address books stored in the plurality of MFPs, to the server.

According to Japanese Unexamined Laid-open Patent Publication No. H6-023734, there is a suggested technology to collect abbreviated dial information from a plurality of facsimile apparatuses to a host computer and create new abbreviated dial information by merging the collected abbreviated dial information by the host computer.

However, even if the address books stored in the plurality of MFPs are automatically migrated as referred to the above-mentioned publication and etc., it is not still useful that users have to classify them manually depending on the frequency of use, since all the destination data pieces registered in the address books are simply re-registered without consideration of the usage history of the destination data pieces.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an address book central administration apparatus capable of automatically collecting destination data pieces stored in a plurality of image processing apparatuses and creating useful address books for respective users based on the collected destination data pieces.

It is another object of the present invention to provide an address book creation method of the address book central administration apparatus capable of automatically collecting destination data pieces stored in a plurality of image processing apparatuses and creating useful address books for respective users based on the collected destination data pieces.

It is yet another object of the present invention to provide a computer readable recording medium having an address book creation program recorded therein to make a computer of the address book central administration apparatus implement the address book creation method.

According to a first aspect of the present invention, an address book central administration apparatus includes:
- a data collector that collects at least transmission histories from a plurality of image processing apparatuses connected to the address book central administration apparatus via a network;
- a destination data extractor that extracts from the transmission histories collected by the data collector, destination data pieces included in the transmission histories;
- an importance level calculator that calculates levels of importance of the destination data pieces extracted by the destination data extractor; and
- an address book creator that registers in address books, destination data pieces having high levels of importance, among those having the levels of importance calculated by the importance level calculator.

According to a second aspect of the present invention, an address book creation method of an address book central administration apparatus, includes:
- collecting at least transmission histories from a plurality of image processing apparatuses connected to the address book central administration apparatus via a network;
- extracting from the collected transmission histories, destination data pieces included in the transmission histories;
- calculating levels of importance of the extracted destination data pieces; and
- registering in address books, destination data pieces having high levels of importance, among those having the calculated levels of importance.

According to a third aspect of the present invention, a computer readable recording medium has an address book creation program recorded therein to make a computer of an address book central administration apparatus execute:
- collecting at least transmission histories from a plurality of image processing apparatuses connected to the address book central administration apparatus via a network;
- extracting from the collected transmission histories, destination data pieces included in the transmission histories;

calculating levels of importance of the extracted destination data pieces; and registering in address books, destination data pieces having high levels of importance, among those having the calculated levels of importance.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 4 is a view showing an example of an address book obtained from a MFP;

FIG. 5 is a view showing an example of a transmission history obtained from a MFP;

FIG. 6 is a view showing a list of destination data pieces sorted in descending order of numbers of transmission times;

FIG. 7 is a view showing an example of an address book created in the server;

FIG. 11 is a table showing connections between transmission times and coefficients, to be used for weighting.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
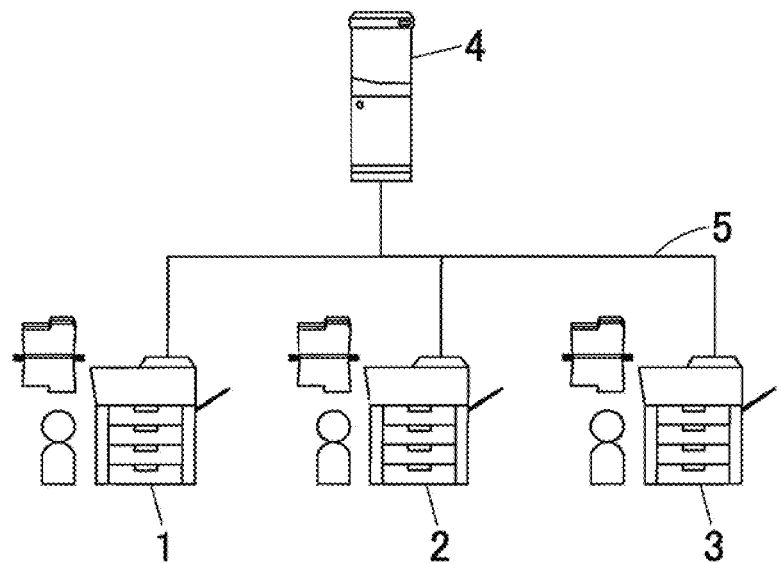
FIG. 1 is a view showing a configuration of an image processing system in which an address book central administration apparatus according to one embodiment of the present invention is employed.

As shown in FIG. 1, an image processing system according to one embodiment of the present invention includes MFP 1, 2 and 3 as a plurality of image processing apparatuses and a server 4 as an address book central administration apparatus that centrally administers address books stored in the MFP 1, 2 and 3. The MFP 1, 2 and 3 and the server 4 are interconnected via a network 5.

The MFPs 1, 2 and 3 store address books including destination data pieces registered therein to allow users to select among them when intend to transmit image data or other data, and also store past transmission histories.

Figure 2:
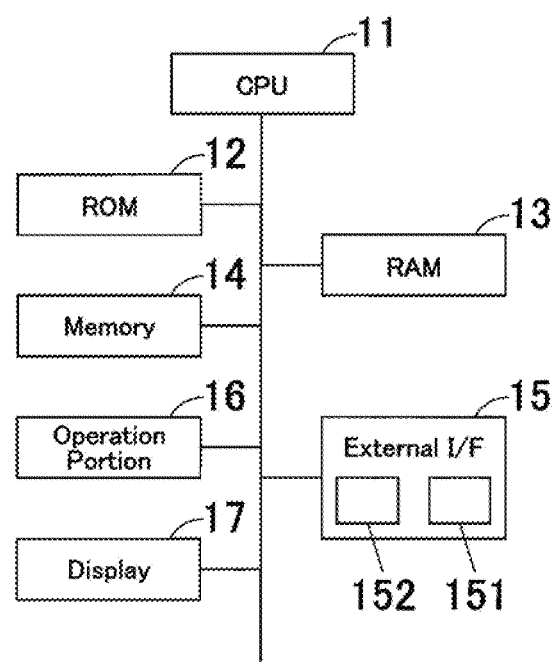
FIG. 2 is a block diagram showing an electrical configuration of a server that is the address book central administration apparatus employed in the system of FIG. 1.

As shown in the electrical configuration of the server 4 in FIG. 2, the server 4 is constructed of a personal computer, and includes a CPU 11, a ROM 12, a RAM 13, a memory 14, an external interface (I/F) 15, an operation portion 16 and a display 17.

The CPU 11 centrally controls all operations thereof. In addition, in this embodiment, it has functions of collecting data from the MFPs 1, 2 and 3, analyzing data and creating new address books. These functions will be further described later.

The ROM 12 is a memory that stores in itself an operation program for the CPU 11.

The RAM 13 is a memory that provides an operation area for the CPU 11 to execute an operation program.

The memory 14 is constructed of a hard disk drive or etc. for example, and it records in itself respective users' own address books including destination data pieces, and others.

The external I/F 15 exchanges data with the MFPs 1, 2 and 3, and it includes a transmitter 151 and a receiver 152.

The operation portion 16 includes a keyboard, a mouse and etc., and it is used by an administrator or etc. for various entry operations and other operations. The display 17 is constructed of a liquid crystal display or etc. and it displays on itself contents of data, messages, status of the apparatus, and other information.

Hereinafter, the functions of collecting data from the MFPs 1, 2 and 3, analyzing data and creating new address books, executed by the CPU 11 of the server 4, will be explained below.

Figure 3A:
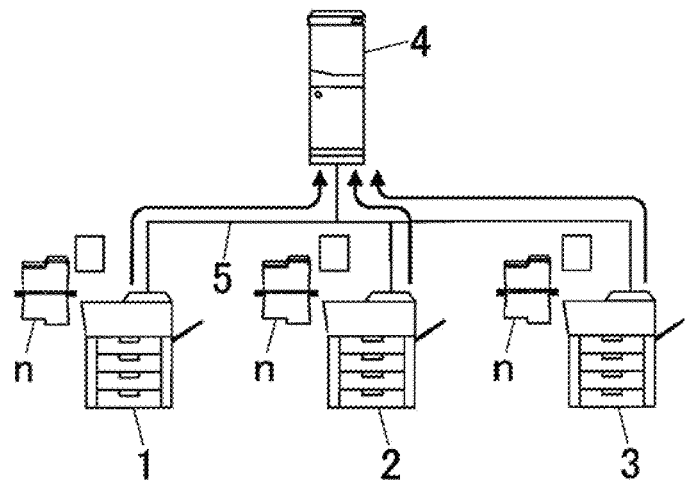
FIG. 3 is a view to explain an operation of the server, to collect transmission histories from respective MFPs and create address books.

A shown in FIG. 3A, under the control of the CPU 11, shared address books n shared with users and transmission histories, stored in the MFPs 1, 2 and 3 are collected therefrom via the network 5. The arrows of FIG. 3A indicate how the server 4 collects data. FIG. 4 shows an example of a shared address book n obtained from the MFP 1, and FIG. 5 shows an example of a transmission history obtained from the MFP 1. Address books include "type of transmission", "destination name" and "destination detail", and transmission histories include "transmission time and date", "user name" that is a transmitter's name, "type of transmission", "destination", "result" and other data.

And the collected transmission histories are analyzed and destination data pieces are extracted therefrom, and then respective destinations described in the shared address book n are connected to matching numbers of transmission times. Alternatively, another configuration may be employed, wherein only transmission histories are collected from the MFPs 1, 2 and 3 and destination data pieces are extracted therefrom, and then the respective destination data pieces extracted therefrom are connected to matching numbers of transmission times. However, collecting both the transmission histories and the shared address books n would make the connecting operation easier.

After repeating the operation above about the MFPs 1, 2 and 3, overlapping destination data pieces are consolidated into one, and a list of the destination data pieces is sorted in the descending order of the numbers of transmission times. FIG. 6 shows a list of the destination data pieces sorted in the descending order of the numbers of transmission times.

Figure 3B:
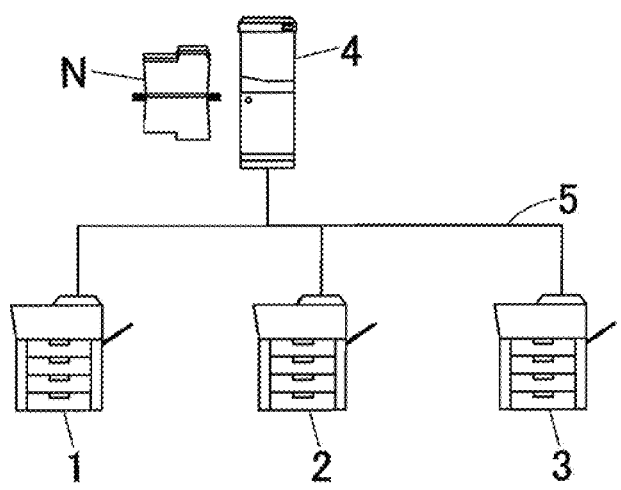

Subsequently, upper ones of the destinations listed in the order of the numbers of transmission times are extracted and judged as priority destinations, and as shown in FIG. 3B, those are registered as basic data into address books N of the respective users. And the address books N are recorded in the memory 14.

FIG. 7 shows an example of one of the newly created address books N. In FIG. 7, upper ones of the destinations listed in the order of the numbers of transmission times extracted among those shown FIG. 6, are registered therein.

In this embodiment, when the address books n recorded in the MFPs 1, 2 and 3 are collected by the server 4, the address books n are kept recorded as shared address books in the MFPs 1, 2 and 3 as used to be. Thus, the address books n can be used concomitantly with the new address books N created by the server 4.

Figure 3C:
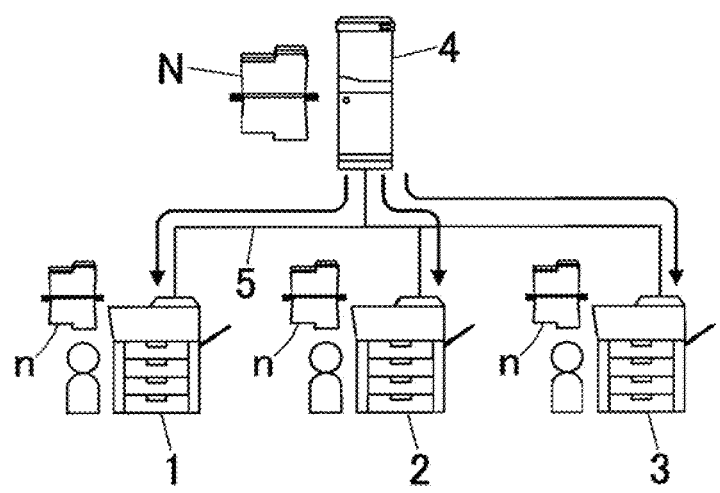

Meanwhile, on the side of the server 4 that created the new address books N, data of the new address books N is called out from the memory 14 and provided to the MFP 1, 2 and 3, according to a request received from the MFPs 1, 2 and 3. The arrows of FIG. 3C show that destination data pieces are provided to the MFP 1, 2 and 3 from the server 4.

Hereinafter, a procedure to create new address books N, executed in the server 4, will be explained with reference to a flowchart shown in FIG. 8. This procedure is executed by the CPU 11 of the server 4, according to an operation program recorded in a recording medium such as the ROM 12.

In Step S1, the address book n and a transmission history are obtained from one MFP among the MFPs 1, 2 and 3 administered by the server 4. And in Step S2, the obtained transmission history is analyzed and respective destinations included in the address book n are connected to matching numbers of transmission times.

Then in Step S3, it is judged whether or not the collecting operation above is completed about all the administered MFPs 1, 2 and 3. If the collecting operation is not completed about all the MFPs 1, 2 and 3 (NO in Step S3), the routine goes back to Step S1 and repeats Steps S1 through S3 until the collecting operation is completed about all the MFPs 1, 2 and 3. If the collecting operation is completed about all the MFPs 1, 2 and 3 (YES in Step S3), the routine proceeds to Step S4.

In Step S4, among the destination data pieces obtained from the respective MFPs and connected to the numbers of transmission times, overlapping ones are consolidated into one, and their numbers of transmission times are also totalized.

Then in Step S5, the list is sorted in the descending order of the numbers of transmission times (in the higher order of levels of importance) and a predetermined number of destination data pieces upper on the list, are extracted therefrom. And in Step S6, the extracted destination data pieces are registered in their respective users' own address books N. And then, the routine terminates.

As described above, among the collected destination data pieces, only those having larger numbers of transmission times (high levels of importance) are registered, meanwhile the other unnecessary ones having the smaller numbers of transmission times (low levels of importance) are not registered. Thus, users do not have to classify them manually according to whether or not the levels of importance are high, after their own address books N are newly created, which would greatly improve usability.

A procedure to create new address books N of the respective users will be explained with reference to a flowchart shown in FIG. 9. This procedure is also executed by the CPU 11 according to an operation program recorded in a recording medium such as the ROM 12.

In Step S11, the address book n and a transmission history are obtained from one MPF among the MFPs 1, 2 and 3 administered by the server 4. And in Step S12, the obtained transmission history is analyzed and respective destinations included in the address book n are connected to matching numbers of transmission times.

Then in Step S13, it is judged whether or not the collecting operation above is completed about all the administered MFPs 1, 2 and 3. If the collecting operation is not completed about all the MFPs 1, 2 and 3 (NO in Step S13), the routine goes back to Step S11 and repeats Steps S1 through S3 until the collecting operation is completed about all the MFPs 1, 2 and 3. If the collecting operation is completed about all the MFPs 1, 2 and 3 (YES in Step S13), the routine proceeds to Step S14.

In Step S14, the destination data pieces obtained from the respective MFPs and connected to the numbers of transmission times, are classified by user. Then in Step S15, among the destination data pieces obtained from the respective MFPs, overlapping ones are consolidated into one and their numbers of transmission times are also totalized, about each classification of user.

Then in Step S16, the list is sorted in the descending order of the numbers of transmission times (in the higher order of levels of importance) and a predetermined number of destination data pieces upper on the list, are extracted therefrom. And in Step S17, the extracted destination data pieces are registered in the address book N about each classification of user. And then, the routine terminates.

As described above, destination data pieces having larger numbers of transmission times are registered in an address book about each classification of user, and thereby new address books are created for the respective users. Thus, users do not have to manually create their own address books, which would greatly improve usability.

Figure 8:
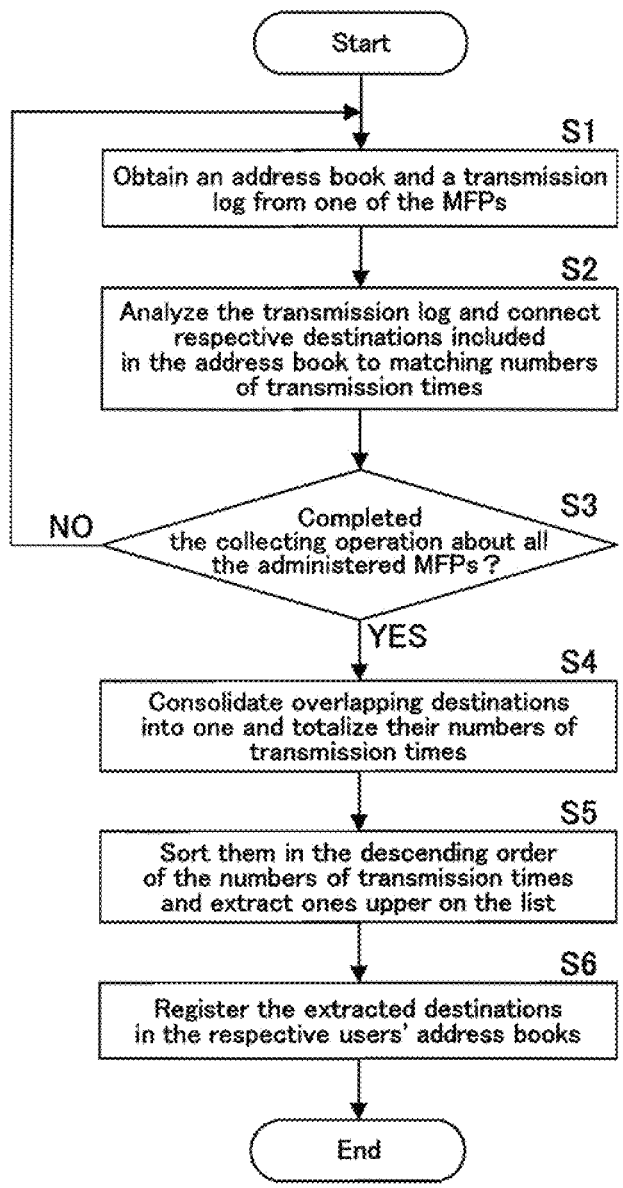
FIG. 8 is a flowchart representing a procedure to create new address books, executed in the server.
Figure 9:
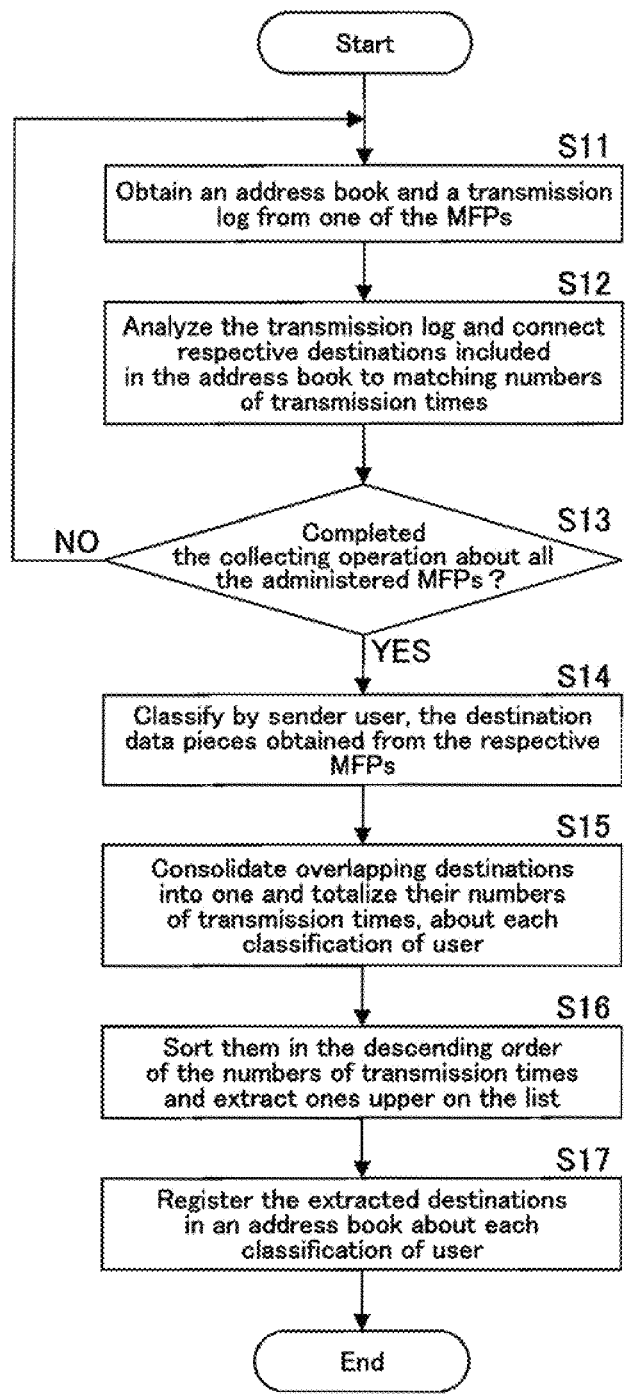
FIG. 9 is another example of a flowchart representing a procedure to create new address books, executed in the server.

In the embodiments explained with FIG. 8 and FIG. 9, a number of transmission times is employed as a level of importance. However, a level of importance may be calculated based on both a number of transmission times and a transmission time and date.

A procedure to register in address books recorded in the server 4, destination data pieces having larger numbers of transmission times and more recent transmission times and dates, as those having high levels of importance, will be explained with reference to a flowchart shown in FIG. 10. This procedure is also executed by the CPU 11 of the server 4 according to an operation program recorded in a recording medium such as the ROM 12.

In Step S21, the address book n and a transmission history are obtained from one MPF among the MFPs 1, 2 and 3 administered by the server 4. And in Step S22, the obtained transmission history is analyzed and numbers of points are calculated for respective destinations included in the address book n with consideration of weighting, then the respective destinations are connected to their calculated numbers of points. The numbers of points are calculated according to the formula: Number of Transmission Times×Coefficient Value, thus a weight can changed depending on a coefficient value. FIG. 11 shows examples of coefficient values. In this embodiment, a larger coefficient value is set for destinations having more recent transmission times and dates. The maximum coefficient value p is set for destinations having transmission times and dates of the most recent month, the coefficient value (p−1) is set for destinations having transmission times and dates of the $2^{nd}$ most recent month, the coefficient value (p−2) is set for destinations having transmission times and dates of the $3^{rd}$ most recent month . . . thus a smaller coefficient values is set for destinations having earlier transmission times and dates. And the coefficient value '1' is set for destinations having transmission times and dates earlier than the recent p months.

Then in Step S23, it is judged whether or not the collecting operation above is completed about all the administered MFPs 1, 2 and 3. If the collecting operation is not completed about all the MFPs 1,2 and 3 (NO in Step S23), the routine goes back to Step S21 and repeats Steps S21 through S23 until the collecting operation is completed about all the MFPs 1, 2 and 3. If the collecting operation is completed about all the MFPs 1, 2 and 3 (YES in Step S23), the routine proceeds to Step S24.

In Step S24, among the destination data pieces obtained from the respective MFPs and connected to their number of points, overlapping ones are consolidated into one, and their points are also totalized.

Then in Step S25, the list is sorted in the descending order of the numbers of points (in the higher order of levels of importance) and a predetermined number of destination data pieces upper on the list, are extracted therefrom. And in Step S26, the extracted destination data pieces are registered in their respective users' own address books N. And then, the routine terminates.

As described above, among the collected destination data pieces, only those having large numbers of points (high levels of importance) are registered, meanwhile the other unnecessary ones having small numbers of points (low levels of importance) are not registered. Thus, users do not have to classify them manually according to whether or not the levels of importance are high, after their own address books N are newly created, which would greatly improve usability.

Furthermore, a level of importance is weighted based on a number of transmission times and a transmission time and date. Thus, more points are given to a destination having a series of recent transmission times and dates, even if its number of transmission times is small. This could cause address books very much practical for users.

Figure 10:
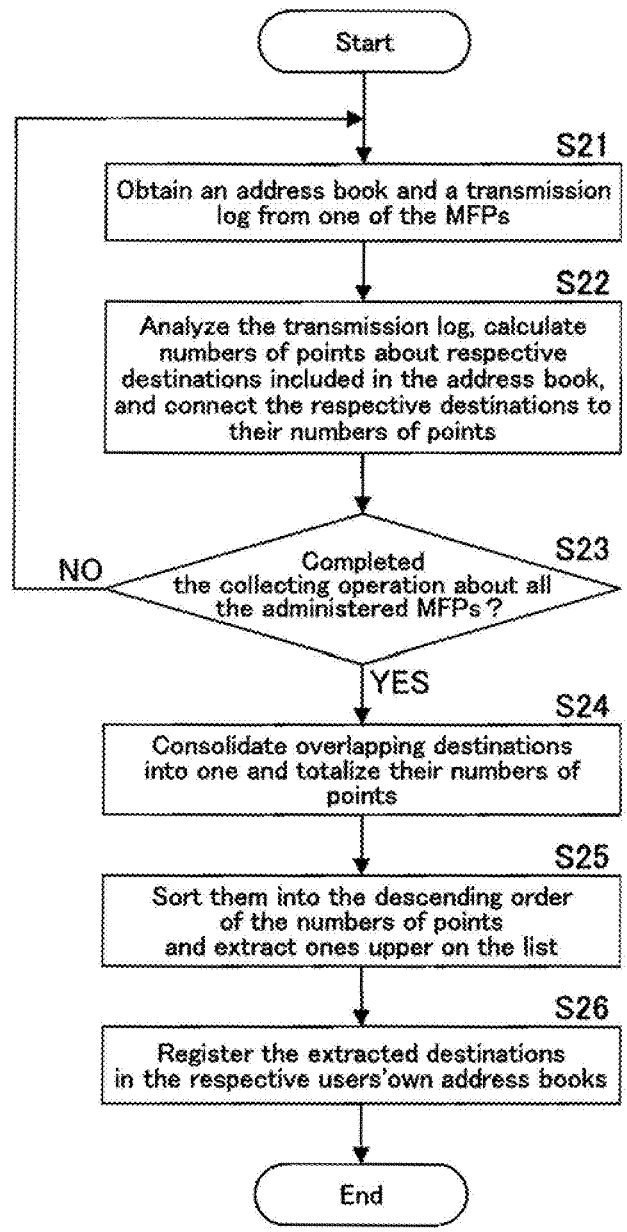
FIG. 10 is yet another example of a flowchart representing a procedure to create new address books, executed in the server.

In this embodiment of FIG. 10, another embodiment like previously explained with FIG. 9, can be employed, wherein the obtained destination data pieces are classified by user and then different address books are created for respective users.

Furthermore, as described in this embodiment, the address book central administration apparatus is constructed of the server 4 interconnected to the MFPs 1, 2 and 3 via the network 5, for example. However, it is not necessarily constructed of the server 4, and can be constructed of one of the MFPs 1, 2 and 3, serving as the address book central administration apparatus.

In this embodiment, the following address book central administration apparatus, an address book creation method thereof, and a computer readable recording medium having an address book creation program recorded therein to make a computer execute processing, are included.

(1) An address book central administration apparatus including:
- a data collector that collects at least transmission histories from a plurality of image processing apparatuses connected to the address book central administration apparatus via a network;
- a destination data extractor that extracts from the transmission histories collected by the data collector, destination data pieces included in the transmission histories;
- an importance level calculator that calculates levels of importance of the destination data pieces extracted by the destination data extractor; and
- an address book creator that registers in address books, destination data pieces having high levels of importance, among those having the levels of importance calculated by the importance level calculator.

With this address book central administration apparatus, at least transmission histories are collected from a plurality of image processing apparatuses, destination data pieces included in the collected transmission histories are extracted, and levels of importance are calculated for the respective destination data pieces. Then, destination data pieces having high levels of importance are automatically registered in address books.

As described above, among the destination data pieces extracted from the transmission histories, only those having high levels of importance are registered in address books, meanwhile the other unnecessary ones having not high levels of importance are not registered therein. Thus, users do not have to classify them manually according to whether or not the levels of importance are high, after their own address books are created.

(2) In the above-described address book central administration apparatus, the importance level calculator may calculate levels of importance of the destination data pieces for respective users owning them, and the address book creator may register destination data pieces having high levels of importance, in address books of the respective users.

With this address book central administration apparatus, levels of importance of destination data pieces are calculated for respective users owning them, and new address books including destination data pieces having high levels of importance are created for the respective users. Thus, the respective users do not have to manually create their own address books, which would greatly improve usability.

(3) The levels of importance may be calculated based on numbers of transmission times.

In this case, a level of importance is calculated based on a number of transmission times and destination data pieces having large numbers of transmission times are registered in address books. This could cause the address books very much practical for users.

(4) The levels of importance may be calculated based on both numbers of transmission times and transmission times and dates.

With this address book central administration apparatus, a level of importance is calculated based on both a number of transmission times and a transmission time and date. Thus, a high level of importance is given to a destination having a series of recent transmission times and dates, even if its number of transmission times is small. This could cause address books very much practical.

(5) An address book creation method of an address book central administration apparatus including:
- collecting at least transmission histories from a plurality of image processing apparatuses connected to the address book central administration apparatus via a network;
- extracting from the collected transmission histories, destination data pieces included in the transmission histories;
- calculating levels of importance of the extracted destination data pieces; and
- registering in address books, destination data pieces having high levels of importance, among those having the calculated levels of importance.

With this address book creation method, among the destination data pieces extracted from transmission histories of respective image processing apparatus, only those having high levels of importance are registered in address books, meanwhile the other unnecessary ones having not high levels of importance are not registered therein. Thus, users do not have to classify them manually according to whether or not the levels of importance are high, which would greatly improve usability.

(6) In the above-described address book creation method, levels of importance of the destination data pieces may be calculated for respective users owning them, and destination data pieces having high levels of importance may be registered in address books of the respective users.

In this case, levels of importance of destination data pieces are calculated for respective users owning them and address books including destination data pieces having high levels of importance are created for the respective users. This is very convenient for the respective users.

(7) The levels of importance may be calculated based on numbers of transmission times.

In this case, a level of importance is calculated based on a number of transmission times and destination data pieces having large numbers of transmission times are registered in address books.

(8) The levels of importance may be calculated based on both numbers of transmission times and transmission times and dates.

In this case, a level of importance is calculated based on both a number of transmission times and a transmission time and date. Thus, a high level of importance is given to a destination having a series of recent transmission times and dates, even if its number of transmission times is small. This could cause address books very much practical.

(9) A computer readable recording medium having an address book creation program recorded therein to make a computer of an address book central administration apparatus execute:

collecting at least transmission histories from a plurality of image processing apparatuses connected to the address book central administration apparatus via a network;

extracting from the collected transmission histories, destination data pieces included in the transmission histories;

calculating levels of importance of the extracted destination data pieces; and registering in address books, destination data pieces having high levels of importance, among those having the calculated levels of importance.

With this recording medium, a computer of an address book central administration apparatus can be made to register in address books, only destination data pieces having high levels of importance among those extracted from transmission histories of respective image processing apparatuses.

(10) In the program recorded in the above-described recording medium, levels of importance of the destination data pieces may be calculated for respective users owning them, and destination data pieces having high levels of importance may be registered in address books of the respective users.

(11) The levels of importance may be calculated based on numbers of transmission times.

(12) The levels of importance may be calculated based on both numbers of transmission times and transmission times and dates.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An address book central administration apparatus connected to a plurality of image processing apparatuses via a network, the address book central administration apparatus comprising:
    a processor;
    a memory;
    a data collector under control of the processor of the address book central administration apparatus that collects, from the plurality of image processing apparatuses administered by the address book central administration apparatus, at least transmission histories of a plurality of transmission users including a particular user and other users, the transmission histories comprising records proving that the transmission users have conducted data transmission from the image processing apparatuses;
    a destination data extractor that extracts destination data from the transmission histories collected by the data collector;
    an importance level calculator that performs a calculation to calculate levels of importance of the destination data extracted by the destination data extractor; and
    an address book creator that creates a new address book that can be used by the particular user through the plurality of image processing apparatuses, the address book including destination data having high levels of importance according to the calculation by the importance level calculator, the address book being stored in the memory,
    wherein the importance level calculator calculates the levels of importance of the destination data extracted from the transmission history of only the particular user.

2. The address book central administration apparatus recited in claim 1, wherein: the levels of importance are calculated based on numbers of transmission times.

3. The address book central administration apparatus recited in claim 1, wherein: the levels of importance are calculated based on both numbers of transmission times and transmission dates.

4. The address book central administration apparatus recited in claim 1, wherein:
the importance level calculator calculates the levels of importance of the destination data extracted from the transmission histories of the particular user and the other users; and
the address book creator creates a new address book that can be used by the particular user, the new address book including the destination data having high levels of importance.

5. The address book central administration apparatus recited in claim 1, wherein:
the address book creator creates a new address book that can be used by the particular user, the new address book including the destination data having high levels of importance.

6. An address book creation method of an address book central administration apparatus that comprises a processor and a memory and that is connected to a plurality of image processing apparatuses via a network, the method comprising:
collecting, with the processor, from the plurality of image processing apparatuses administered by the address book central administration apparatus, at least transmission histories of a plurality of transmission users including a particular user and other users, the transmission histories comprising records proving that the transmission users have conducted data transmission from the image processing apparatuses;
extracting, with the processor, destination data from the collected transmission histories;
calculating, with the processor, levels of importance of the extracted destination data comprising calculating the levels of importance of the destination data extracted from the transmission history of only the particular user; and
creating, with the processor, a new address book that can be used by the particular user through the plurality of image processing apparatuses, the address book including destination data having high levels of importance according to the calculating of the levels of importance of the extracted destination data that is recorded in the memory.

7. The address book creation method recited in claim 6, wherein:
the levels of importance are calculated based on numbers of transmission times.

8. The address book creation method recited in claim 6, wherein:
the levels of importance are calculated based on both numbers of transmission times and transmission dates.

9. The address book creation method of an address book central administration apparatus recited in claim 6, further comprising:
calculating the levels of importance of the destination data extracted from the transmission histories of the particular user and the other users; and
creating a new address book that can be used by the particular user, the new address book including the destination data having high levels of importance.

10. The address book creation method of an address book central administration apparatus recited in claim 6, further comprising:
creating a new address book that can be used by the particular user, the new address book including the destination data having high levels of importance.

11. A non-transitory computer readable recording medium having an address book creation program recorded therein to cause a computer of an address book central administration apparatus that comprises a processor and a memory, which is connected to a plurality of image processing apparatuses via a network, execute:
collecting, with the processor, from the plurality of image processing apparatuses administered by the address book central administration apparatus, at least transmission histories of a plurality of transmission users including a particular user and other users, the transmission histories comprising records proving that the transmission users have conducted data transmission from the image processing apparatuses;
extracting, with the processor, destination data from the collected transmission histories;
calculating, with the processor, levels of importance of the extracted destination data comprising calculating the levels of importance of the destination data extracted from the transmission history of only the particular user; and
creating, with the processor, a new address book that can be used by the particular user through the plurality of image processing apparatuses, the address book including destination data having high levels of importance according to the calculating of the levels of importance of the extracted destination data that is recorded in the memory.

12. The non-transitory computer readable recording medium recited in claim 11, wherein:
the levels of importance are calculated based on numbers of transmission times.

13. The non-transitory computer readable recording medium recited in claim 11, wherein:
the levels of importance are calculated based on both numbers of transmission times and transmission dates.

14. The non-transitory computer readable recording medium recited in claim 11, wherein the program further causes the computer to execute:
calculating the levels of importance of the destination data extracted from the transmission histories of the particular user and the other users; and
creating a new address book that can be used by the particular user, the new address book including the destination data having high levels of importance.

15. The non-transitory computer readable recording medium recited in claim 11, wherein the program further causes the computer to execute:
creating a new address book that can be used by the particular user, the new address book including the destination data having high levels of importance.

* * * * *